(12) United States Patent
Mohideen et al.

(10) Patent No.: US 8,725,178 B2
(45) Date of Patent: May 13, 2014

(54) HANDHELD DEVICE HAVING LOCATION-BASED FEATURES FOR PLANT WORKERS

(75) Inventors: Mohammed Ibrahim Mohideen, Karnataka (IN); Gurumurthy Swaminathan, Karnataka (IN); Niranjan Rao, Karnataka (IN); Mahesh Kumar Gellaboina, Andhra Pradesh (IN); Lokanatha Reddy J., Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 92 days.

(21) Appl. No.: 13/402,101

(22) Filed: Feb. 22, 2012

(65) Prior Publication Data
US 2013/0217417 A1 Aug. 22, 2013

(51) Int. Cl.
*H04W 24/00* (2009.01)
(52) U.S. Cl.
USPC ............... 455/456.3; 455/414.2; 455/422.1
(58) Field of Classification Search
USPC ............ 455/456.3, 456.1, 422.1, 414.2, 403
See application file for complete search history.

(56) References Cited

U.S. PATENT DOCUMENTS

2009/0065578 A1* 3/2009 Peterson et al. ............... 235/382
2011/0047115 A1 2/2011 Johnson et al.

FOREIGN PATENT DOCUMENTS

| EP | 2048625 | | 4/2009 | |
|---|---|---|---|---|
| EP | 2048625 | A1 * | 4/2009 | ............... G07C 1/14 |
| EP | 2077473 | | 7/2009 | |

* cited by examiner

*Primary Examiner* — Chuong A Ngo
(74) *Attorney, Agent, or Firm* — Jetter & Associates, P.A.

(57) ABSTRACT

A method of operating an industrial plant having processing units that includes a wireless network including a network server, at least one router, and a plurality of workers including a first worker. A first handheld computing device is provided having a wireless transceiver and a processor programmed to implement a location-based service algorithm stored in non-transitory machine readable storage to a first worker. The location-based service algorithm implements obtaining location information that identifies a physical location for the first worker, and adding the location information to wireless transmissions of information by the first worker to others of the plurality of workers or to the network server. The first handheld computing device wirelessly receives server provided plant information that is a function of the physical location, and the first worker performs at least one action guided at least in part by the server provided plant information.

18 Claims, 2 Drawing Sheets

HANDHELD DEVICE HAVING LOCATION-BASED FEATURES FOR PLANT WORKERS

FIELD

Disclosed embodiments relate to handheld (mobile) computing devices and software for handheld computing devices that aid workers at industrial plants with their activities including day-to-day operation of the plant.

BACKGROUND

Some commercially available software products enable plant workers (e.g., engineers, managers, technicians and operators) to remotely address problems in the field to help keep industrial plant equipment running within safe operating limits and at optimum performance. For example, one such software product is Honeywell International's FIELD ADVISOR. The FIELD ADVISOR is a software package used by plant workers having handheld computing devices in conjunction with a wireless local area network (WLAN). For example, the FIELD ADVISOR can improve overall plant efficiency and reliability by recording critical asset data and by ensuring the data falls within safe operating limits. If the equipment is operating outside the plant's set limits, the Field Advisor guides the worker (e.g., operator) through the necessary steps to correct the problem. For example, when an asset exceeds critical (operating) limits, appropriate actions are not always apparent to the operator and the wrong decision can have a wide range of consequences. The FIELD ADVISOR can provide information that ensures the worker considers operating limits up front, which can improve overall production efficiency and safety.

The FIELD ADVISOR running on the operator's handheld computer device can be used in conjunction with a Wireless mesh network. This solution allows the workers to download specific tasks and instructions (from the network server), and then upload results (to the network server) for reporting after the tasks are completed. Such communications helps plant maintenance, operations, and reliability teams share information between them more quickly, supervisors plan shift workloads more effectively, and allows new workers (e.g., operators) to be trained at a faster pace.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize although known software packages for handheld (mobile) computing devices for plant workers (e.g., engineers, managers, technicians and operators) can improve overall plant efficiency and reliability, such known software packages do not consider the location of the workers, and thus cannot provide any services or features based on the physical location of the worker. Disclosed embodiments include software packages for handheld computing devices for plant workers which include services or features based on the location of the worker that are referred to herein as "location-based features".

Disclosed embodiments also include handheld (mobile) computing devices that provide location-based features that can aid a plant worker in their decision making and efficiency beyond the aid provided by known software packages for handheld computing devices. For example, given the current physical location of a worker, (and hence the handheld computing device), all relevant historical data about the equipment (proximate to the worker) may be presented to the worker which can facilitate certain on the spot decision making. Similarly, knowing the locations of tasks (to be executed) can help the worker more efficiently move inside the plant.

DETAILED DESCRIPTION

Figure 1:
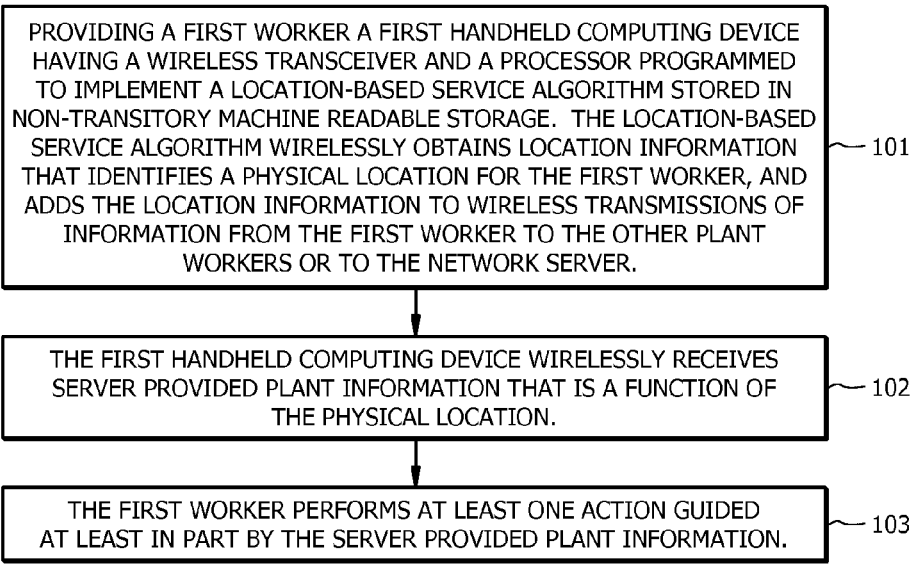
FIG. 1 is a flow chart that shows steps in a method of operating an industrial plant where the plant workers have a disclosed handheld computing device having location-based features, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1 is a flow chart that shows steps in a method 100 of operating an industrial plant where the plant workers each have a disclosed handheld computing device having location-based features, according to an example embodiment. The industrial plant has processing units (e.g., processing equipment or groups of processing equipment) and includes a wireless network including a network server, and a plurality of workers that communicate over the wireless network.

The wireless network in one particular embodiment can comprise a wireless mesh network (WMN) which is a special type of wireless ad-hoc network, where the communications network is made up of radio nodes organized in a mesh topology. Wireless mesh networks comprise mesh clients, mesh routers and gateways. The mesh clients are wireless devices while the mesh routers forward traffic to and from the gateways which may but need not connect to the Internet. A mesh network is reliable and offers redundancy, so that when one node can no longer operate, the rest of the nodes can still communicate with each other, directly or through one or more intermediate nodes. As known in the art, wireless mesh networks can be implemented with various wireless technology including 802.11, 802.15, 802.16, cellular technologies or combinations of more than one type. The wireless network can comprise a Wi-Fi mesh network, Global System for Mobile Communications (GSM), 3G, or other wireless network compatible with handheld computing devices.

Step 101 comprises providing a first worker a first handheld computing device having a wireless transceiver and a processor programmed to implement a location-based service algorithm stored in non-transitory machine readable storage. In one particular embodiment the handheld computing device can be based on the DOLPHIN 9900 mobile computer provided by Honeywell International. The location-based service algorithm wirelessly obtains location information that identifies a physical location for the first worker, and adds the location information to wireless transmissions of information from the first worker to the other plant workers and/or to the network server. In step 102 the first handheld computing device wirelessly receives server provided plant information that is a function of the physical location. Step 103 comprises the first worker performing at least one action guided at least in part by the server provided plant information.

The first handheld computing device can include a GPS that provides the physical location of the worker. As known in the art, a GPS is a space-based satellite navigation system that provides location and time information where there is an unobstructed line of sight to four (4) or more GPS satellites. Alternatively, the first handheld computing device can calculate its physical location from timing information including timing information obtained from the network server, such as based on Timing Measurement Action (TMA) frames (e.g., as disclosed in the IEEE 802.11v specification). However, the determination of the physical location of the worker need not be based on timing information. For example, Wi-Fi may use a known mechanism to calculate location that is not based on timing information. Another source of location information useful for the worker can be based on barcode reading when barcodes are distributed throughout the facility/industrial plant, which can provide the location information for assets in the plant including the processing units. In this embodiment, the handheld computing device includes a camera and software for reading the bar code image data sensed by the camera. The bar code can provide location information. Similarly, another source of location information useful for the worker can be provided by Radio-frequency identification (RFID) tags when the processing units include RFID tags. In this embodiment, the handheld device includes RFID reader software.

The network server can include a data historian so that the server provided plant information provides historical data from the data historian about the particular processing unit that is proximate (e.g., proximate can be set be a preprogrammed maximum distance) to the physical location of the first worker. Such location information can facilitate certain on the spot decision making. The first handheld computing device can display (on its display screen) a location of tasks to be executed by the first worker relative to the physical location. The location of the tasks can help workers (e.g., operators) to optimize their movement inside the plant.

When the worker sends an observation or notification, as noted above, the location information is automatically added to the transmission. Hence, when the task to correct this observation is executed or generated, the maintenance crew can have the location information for the task. For example, in a long pipeline, if a leakage is found, the location of the leak can be helpful to arrest the leakage. Further, location information can be helpful for scaffolding and flow measurements and radiography. Similarly, when a worker stands at a given location and requests the history of all the changes that happened at that location, the location-based service algorithm can list the equipment for which the history is required and based on selection, can display the maintenance/equipment history for such equipment.

When multiple processing units are present at the same location or in proximity to one another, a plant worker conventionally uses identification mechanisms such as RFID or barcode on the process unit (or bar code on a processing unit area) to distinguish them. Some of these identification tags may also undergo wear and tear which makes identification of a particular process unit difficult. The location-based service algorithm can be used for identifying specific processing unit at the plant from multiple process units within a particular location or a particular area.

Accurate physical location of the worker provided by disclosed embodiments can be used to narrow down the set of multiple processing units near the worker's physical location, where a list of processing units determined to be nearby the worker's physical location can be sent by the server to the handheld device of the worker. Further, when the handheld computing device includes a camera, the worker may use mechanisms for identifying specific processing units using code implementing image processing algorithm(s) to implement image-based recognition to identify a specific processing unit of interest from the list of nearby processing units. Disclosed embodiments can thus narrow down units from a set of similar units when the set of similar equipment are spread out more than the area that can be narrowed down by the location-based service algorithm. For example, a compressor station having multiple compressors of similar make, shape and size in proximity to one another can make it difficult to identify a particular compressor. In another embodiment, the server can identify a specific compressor on a screen of the handheld device from among the set of compressors represented on the screen (e.g., represented each as blocks corresponding to their relative locations), such as by highlighting a block that represents a particular compressor in need of repair.

The location-based service algorithm can also provide location-based voice support to the handheld computing device that provides audio that directs the worker with step-by-step instructions to execute tasks. The location information can also be used to decide on the level of voice/audio as well. For examples, certain plant locations may have high environmental noise (e.g., as suggested by a survey) compared to rest of the plant.

The location-based service algorithm can also provide alarms through handhelds based on location details in the case of any urgency, such as notifying the worker having the handheld devices for exit from fire and accidents and safe assembled area. The location information can categorize if the worker is in emergency/warning zone/alert zone with respect to an incident or accident location.

The location-based service algorithm can also provide line tracing. In this embodiment the location information is used to identify process flow line in a plant and to identify all the equipments on that line. Such information can be helpful in line isolation and draining of the lines. If the coordinates are available in the database of all the piping diagrams, the maintenance worker while standing on a spot can identify all the pipe lines that are present there (either underground or overhead or surface) with the click of a button. And when the maintenance worker elects one, he or she would get to know what other units/lines/branches will be affected in case of maintenance. Also, for example, if the maintenance worker needs to give digging instruction, he or she can be provided the clearance (from other departments) required before he or she starts the work.

The location-based service algorithm can also provide a task list for the worker when worker nears one or more predetermined locations in the plant, such as to provide a task alerts/reminder when a field worker nears a designated measurement spot for data collection or troubleshooting. The task or task list for a worker or a mobile device is predetermined and loaded along with related configuration information prior to task execution. If these tasks are tagged with asset location information as well, then the worker can relate tasks with the asset's physical location. One benefit is that the device can generate reminders when a worker walks passed a location where he/she is supposed to execute a task. The location-based service algorithm can also create approximate location maps of the assets by making the worker travel through the plant and noting down the instruments. Examples includes show nearest fire extinguisher, safety equipment, etc.

Figure 2:
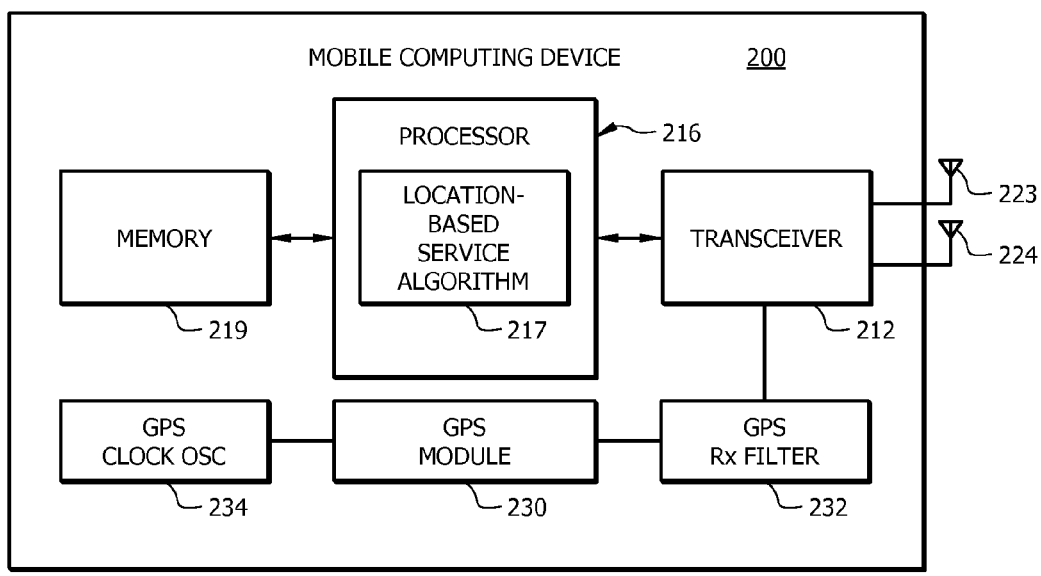
FIG. 2 is a block diagram depiction of an example handheld computing device having a global positioning system (GPS) that provides location-based services, according to an example embodiment.

FIG. 2 is a block diagram depiction of an example handheld computing device 200 having GPS that provides location-based services, according to an example embodiment. Computing device 200 includes a processor 216 programmed to implement a location-based service algorithm 217 stored in non-transitory machine readable storage shown as memory 219. The location-based service algorithm 217 is operable to obtain location information for the handheld computing device involved in operating an industrial plant (e.g., see industrial plant 300 shown in FIG. 3 described below) having processing units and a wireless network including a network server, at least one router and a plurality of workers including a first worker having a disclosed handheld computing device. The location-based service algorithm 217 adds location information for the handheld computing device automatically to wireless transmissions of information by the first worker to other plant workers and/or to the network server.

Handheld computing device 200 includes a wireless transceiver 212. The transceiver 212 is coupled to an antenna 223. Handheld computing device 200 also includes a GPS clock oscillator 234 coupled to GPS module 230, where the GPS module 230 is coupled to the transceiver 212 through GPS Rx filter 232, and the transceiver 212 is also coupled to a GPS antenna 224.

Figure 3:
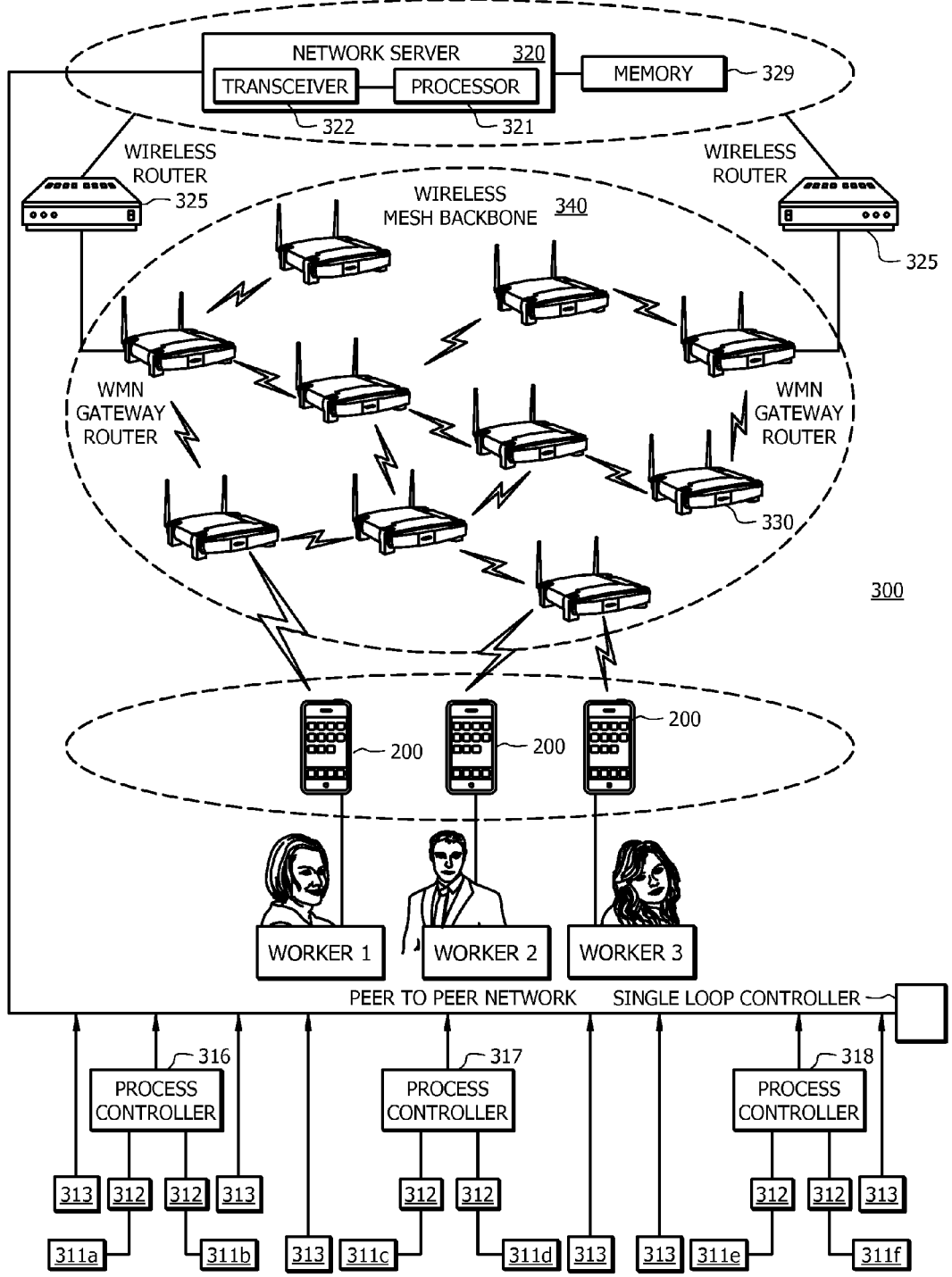
FIG. 3 is a block diagram of an industrial plant comprising processing units, along with a wireless communications network including a network server, at least one router, and a plurality of operators having disclosed handheld computing devices, according to an example embodiment.

FIG. 3 is a block diagram of an industrial plant 300 comprising processing units 311a-f, and actuators 312 and sensors 313 coupled to the processing units, along with a wireless communications network including a network server 320, at least one router shown as wireless routers 325 and gateway routers 330 arranged in a wireless mesh backbone 340, and a plurality of workers shown as workers 1, 2 and 3 each having a disclosed handheld computing device 200. As described above relative to FIG. 2, handheld computing devices 200 include a wireless transceiver and a processor programmed to implement a disclosed location-based service algorithm stored in non-transitory machine readable storage. The location-based service algorithm obtains location information that identifies a physical location for the worker, and adds the worker's location information to wireless transmissions of information by the worker to other workers and/or to the network server 320. The network server 320 includes a processor 321 and a wireless transceiver 322 for wirelessly sending plant information to the handheld computing devices 200 that is a function of the physical location of the worker. Network server 320 is also coupled to a memory 329 that can store information including data for a data historian.

Industrial plant 300 is shown configured as a distributed control system (DCS) where the process controller elements 316-318 are not central in location, but are distributed throughout the industrial plant 300 with each component sub-system controlled by one or more controllers. Industrial plant 300 can implement activities such as oil refining, petrochemicals, central station power generation, fertilizers, pharmaceuticals, food and beverage manufacturing, cement production, steelmaking, papermaking, and gas processing.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, although generally described herein being provided by a network server, it is noted that any of the logic/applications based on physical location of worker disclosed herein may also be executed as cloud-based applications. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The Disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a physical computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

We claim:

1. A method of operating an industrial plant having processing units that includes a wireless network including a network server, at least one router, and a plurality of workers including a first worker, comprising:
    providing a first handheld computing device having a wireless transceiver and a processor programmed to implement a location-based service algorithm stored in non-transitory machine readable storage to said first worker, said location-based service algorithm:
        obtaining location information that identifies a physical location for said first worker, and
        adding said location information to wireless transmissions of information by said first worker to said network server and/or to others of said plurality of workers,
        said network server determining whether said physical location of said first worker is within a predetermined distance to at least a first processing unit from said processing units having a pending task to be performed thereon;
    provided said physical location of said first worker is within said predetermined distance of said first processing unit, said network server transmitting selected plant information to said first handheld computing device including information for displaying a location of said pending task relative to said physical location for said first processing unit and information to perform said pending task, and
    said first handheld computing device automatically displaying said selected plant information and said first worker performing said pending task guided at least in part by said selected plant information.

2. The method of claim 1, wherein said first handheld computing device includes a Global Positioning System (GPS) that provides said location information.

3. The method of claim 1, wherein said first handheld computing device calculates said location information from transmissions to and from said network server.

4. The method of claim 1, wherein said network server has a data historian, and wherein said selected plant information provides historical data from said data historian to said first handheld computing device about said first processing unit.

5. The method of claim 1, wherein said location-based service algorithm provides location-based voice support to said first handheld computing device that provides audio that directs said first worker with step-by-step instructions to execute said pending task.

6. The method of claim 1, wherein said location-based service algorithm provides a shortest path to a selected task location-based on said physical location.

7. A handheld computing device, comprising:
    a processor programmed to implement a location-based service algorithm stored in non-transitory machine readable storage,
    a wireless transceiver coupled to said processor, said wireless transceiver having an antenna coupled thereto;
    wherein said location-based service algorithm implements:
        obtaining location information that identifies a physical location for said handheld computing device involved in operating an industrial plant having a processing units including a first processing unit having a pending task and a wireless network including a network server and a plurality of workers including a first worker having said handheld computing device, and
        adding said location information automatically to wireless transmissions of information by said first worker to said network server and/or others of said plurality of workers
    wherein said handheld computing device automatically displays a location of a task to be executed on said first processing unit relative to said physical location received from said network server.

8. The handheld computing device of claim 7, wherein said location-based service algorithm provides location-based voice support to said handheld computing device that provides audio that directs said first worker with step-by-step instructions to execute said pending task.

9. The handheld computing device of claim 7, wherein said location-based service algorithm provides a shortest path to a selected task location-based on said physical location.

10. An industrial plant, comprising:
    processing units, and actuators and sensors coupled to said processing units including a first processing unit having a pending task;
    a wireless communications network including a network server, at least one router, and a plurality of operators having handheld computing devices including a first worker having a first handheld computing device,
    wherein said first handheld computing device includes a wireless transceiver and a processor programmed to implement a location-based service algorithm stored in machine readable storage, said location-based service algorithm:

obtaining location information that identifies a physical location for said first worker, and adding said location information to wireless transmissions of information by said first worker to said network server and/or other workers of said plant, wherein said network server includes a processor and a wireless transceiver, said network server determining whether said physical location of said first worker is within a predetermined distance to said first processing unit, provided said physical location of said first worker is within said predetermined distance of said first processing unit, said network server transmitting selected plant information to said first handheld computing device including information for displaying a location of said pending task relative to said physical location for said first processing unit and information to perform said pending task, and said first handheld computing device automatically displaying said selected plant information and said first worker performing said pending task guided at least in part by said selected plant information.

11. The industrial plant of claim 10, wherein said network server is coupled to a memory including a data historian having historical data about said processing units.

12. The industrial plant of claim 10, wherein said industrial plant is configured as a distributed control system (DCS).

13. The industrial plant of claim 10, wherein said first handheld computing device includes a Global Positioning System (GPS) that provides said location information.

14. The industrial plant of claim 10, wherein said first handheld computing device includes an algorithm that together with transmissions to and from said network server determines said location information.

15. The industrial plant of claim 10, wherein said location-based service algorithm provides a shortest path to a selected task location-based on said physical location.

16. The industrial plant of claim 10, wherein said location-based service algorithm includes code for identifying at least a specific one of a first type of said processing units from multiple other ones of said first type of said processing units at a particular location or particular area within said plant when said first type of said processing units are spread out in an area bigger than that which can be narrowed down by said location-based service algorithm.

17. The industrial plant of claim 16, wherein said processing units include bar codes and said code implements an image processing algorithm.

18. The industrial plant of claim 10, wherein said location-based service algorithm provides location-based voice support to said first handheld computing device that provides audio that directs said first worker with step-by-step instructions to execute said pending task.

* * * * *